(12) United States Patent
Sorg et al.

(10) Patent No.: US 11,519,598 B2
(45) Date of Patent: Dec. 6, 2022

(54) BURNER HOLDER

(71) Applicant: BETEILIGUNGEN SORG GMBH & CO., Lohr am Main (DE)

(72) Inventors: Alexander Sorg, Aschaffenburg (DE); Matthias Lindig, Ingelheim (DE); Manfred Wagner, Lohr am Main (DE); Reinhard Wilhelm, Gemünden (DE)

(73) Assignee: BETEILIGUNGEN SORG GMBH & CO., Lohr Am Main (DE)

( * ) Notice: Subject to any disclaimer, the term of this patent is extended or adjusted under 35 U.S.C. 154(b) by 618 days.

(21) Appl. No.: 16/607,262

(22) PCT Filed: Apr. 30, 2018

(86) PCT No.: PCT/EP2018/061024
§ 371 (c)(1),
(2) Date: Oct. 22, 2019

(87) PCT Pub. No.: WO2018/202618
PCT Pub. Date: Nov. 8, 2018

(65) Prior Publication Data
US 2020/0300455 A1 Sep. 24, 2020

(30) Foreign Application Priority Data
May 5, 2017 (DE) .......................... 102017109738.4

(51) Int. Cl.
*F23C 5/06* (2006.01)
*C03B 5/235* (2006.01)
*F23M 5/02* (2006.01)

(52) U.S. Cl.
CPC ................ *F23C 5/06* (2013.01); *C03B 5/235* (2013.01); *F23M 5/025* (2013.01); *F23M 2900/05021* (2013.01)

(58) Field of Classification Search
CPC .......... F23C 5/06; C03B 5/235; F23M 5/025; F23M 2900/05021
See application file for complete search history.

(56) References Cited

U.S. PATENT DOCUMENTS 2,336,269 A * 12/1943 Luellen ..................... F23C 5/06
431/189
2,358,982 A * 9/1944 Lewis ....................... F23C 5/06
431/189
(Continued)

FOREIGN PATENT DOCUMENTS

DE 3218392 A1 11/1983
EP 2687800 A1 1/2014
(Continued)

OTHER PUBLICATIONS

International Search Report; priority document.
German Office Action for corresponding German Patent Application No. 10 2017 109 738.4 dated Jan. 2, 2018, 5 pages.

*Primary Examiner* — David J Laux
(74) *Attorney, Agent, or Firm* — Greer, Burns & Crain, Ltd.

(57) ABSTRACT

A burner holder for a burner lance in a glass melting plant. To easily and quickly change the burner lance angle to influence the process conditions in the glass melting plant, the burner holder has a retaining unit for securing the burner lance and a sealing plate with a passage. The sealing plate is configured to secure to the glass melting plant and is provided with a recess for receiving a burner lance head. The recess forms at least one part of a passage through the sealing plate. The retaining unit is connected to the sealing plate via at least one first pivot bearing, such that the retaining unit can be pivoted or swiveled about a first axis of rotation. The pivot bearing is attached or embedded directly (Continued)

on the sealing plate or is connected to the sealing plate via a support arm arranged on the sealing plate.

10 Claims, 8 Drawing Sheets

(56) References Cited

U.S. PATENT DOCUMENTS

| | | | | |
|---|---|---|---|---|
| 4,302,179 A * | 11/1981 | Pont | ............................ | F23C 5/06 431/189 |
| 4,525,139 A * | 6/1985 | Bleimann | .............. | C21C 5/5217 431/189 |
| 5,772,719 A * | 6/1998 | Alarcon-Lopez | ........ | C03B 25/08 65/271 |
| 9,187,356 B2 * | 11/2015 | Gallenberger | ............. | F23C 5/06 |
| 2014/0020429 A1 | 1/2014 | Gallenberger et al. | | |
| 2014/0065564 A1 * | 3/2014 | Staley | ...................... | F23D 14/56 432/225 |
| 2015/0354814 A1 * | 12/2015 | Cody | ......................... | F23C 5/06 431/2 |
| 2017/0015579 A1 * | 1/2017 | Charbonneau | ........... | F23D 14/22 |

FOREIGN PATENT DOCUMENTS

| | | |
|---|---|---|
| FR | 843045 A | 6/1939 |
| FR | 2772117 A1 | 6/1999 |

\* cited by examiner

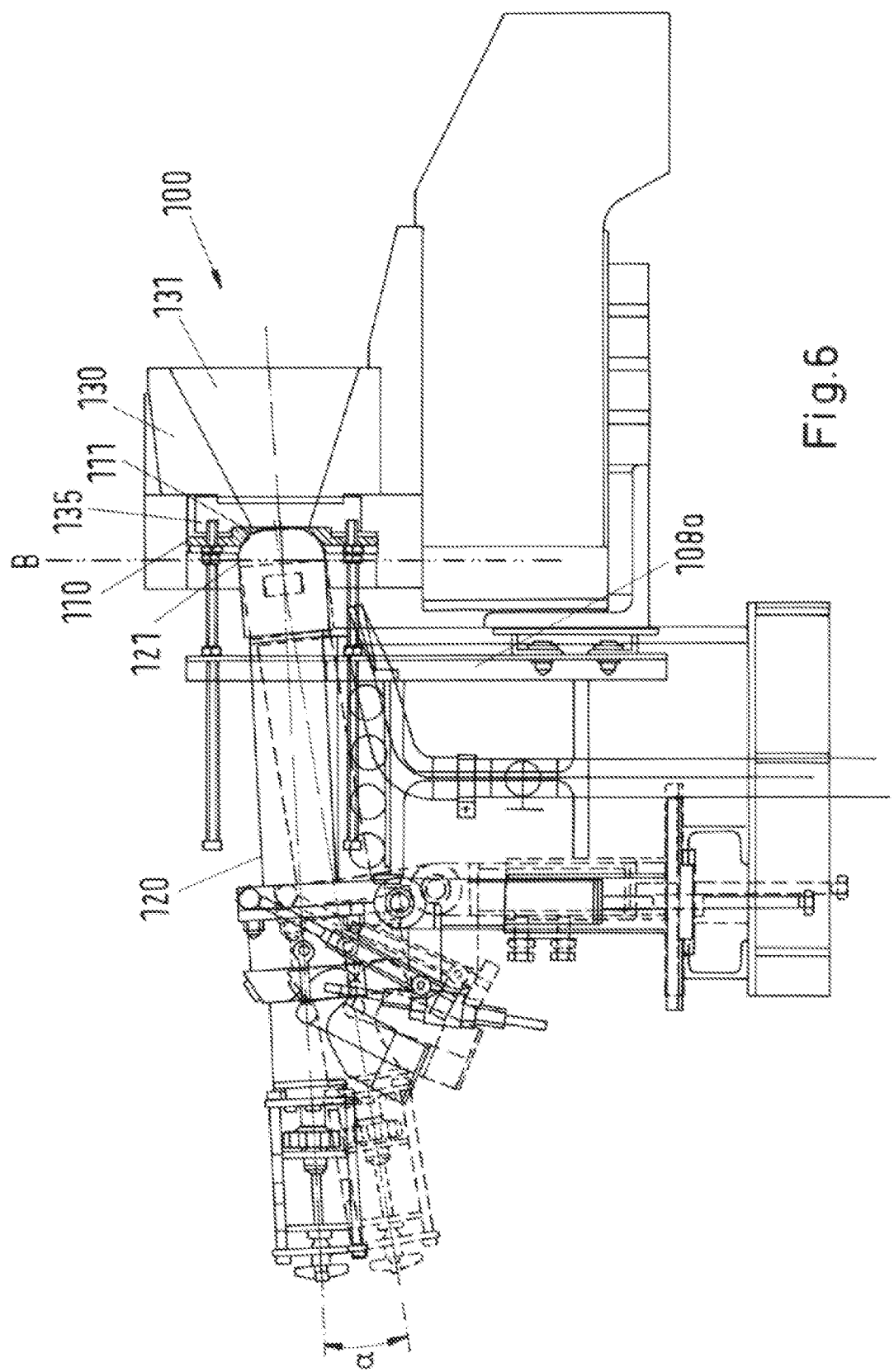

BURNER HOLDER

CROSS-REFERENCES TO RELATED APPLICATIONS

This application claims the benefit of the International Application No. PCT/EP2018/061024, filed on Apr. 30, 2018, and of the German patent application No. 10 2017 109 738.4 filed on May 5, 2017, the entire disclosures of which are incorporated herein by way of reference.

FIELD OF THE INVENTION

The present invention relates to a burner holder for a burner lance for gaseous and/or liquid fuel in a glass melting plant, and to a system for mounting a burner lance on the glass melting plant.

BACKGROUND OF THE INVENTION

Conventional gas melting plants, e.g., for producing utility glass, have a melt tank to which raw materials and/or recycling glass shards are supplied at a first end, and from which a glass melt is taken for production at the opposite end. Above the glass melt, in the area of the first end of the melt tank there is situated a combustion chamber. Gaseous fuel and air are introduced into the combustion chamber for combustion. For the supply of fuel, at least one burner port is made in a wall of the melt tank. The burner port extends from an outer side, facing away from the combustion chamber, of the wall of the melt tank, through the wall into the combustion chamber. Often, the burner port is made in a quarl that is integrated into the wall of the glass melting plant. The quarl forms a segment of the wall (e.g., of a side wall) of the melt tank that is made of a fireproof material.

For the supply of liquid fuel, in FR 843 045 A a burner is described that is set into a through-opening of an oven. The burner is positioned in the opening of the oven via a funnel-shaped water jacket on whose end at the oven a ball joint, situated in a ball bearing housing, is provided. The ball joint moreover forms the oven-side end of the fuel supply line, which is capable of rotation in the ball joint. The angle of rotation of the fuel supply line in the ball joint is achieved in the vertical direction by height displacement through rotation of a screw and rollers on rails, or a drive chain. The rotation in the ball joint in the horizontal direction is achieved by a movement of a yoke along a curved slide path. The disadvantage of the known solution is that the ball bearing housing and the ball joint are situated immediately by the hot atmosphere of the oven, and form a heat sink. As a result, vaporization products and dust condense at this location (the occurrence of dust in a medium-sized melting plant for 300 t of glass per day is more than 1 ton). These materials are frequently alkaline and have a high portion of sulfur, so that increased wear occurs at the oven-side end of the known fuel supply line. There is therefore a need to avoid direct contact of the oven-side end of a burner, or of a ball joint in which the oven-side end of the burner is situated, with the oven atmosphere.

Frequently, for this purpose a cooling plate is mounted before the burner port, on the wall of the glass melting plant or on the quarl, the plate having a recess on its outer side facing away from the combustion chamber. Going out from the recess, a passage extends up to an inner side of the cooling plate, and opens into the burner port.

A head of a burner lance is positioned in the recess of the cooling plate. The fuel—typically gaseous fossil fuel—exits from the head of the burner lance and moves through the passage of the cooling plate and the burner port into the combustion chamber of the glass melting plant.

Small changes in the position of the head of the burner lance or of the angle of the burner lance relative to the burner port can have a significant influence on the process conditions in the combustion chamber of the glass melting plant. Accordingly, the process conditions can easily be modified through a targeted setting of the orientation and/or of the position of the burner lance relative to the burner port.

The burner lance is held on the glass melting plant by a burner holder. A conventional burner holder is known for example from DE 32 18 392 A1. This document describes a pressure spring that presses the burner lance against a cooling element. To change the angle of the burner lance, the entire burner holder of the burner lance has to be detached. The angle is then adjusted. Subsequently, the position of the burner lance in the recess of the cooling plate has to be reset. A precisely reproducible change of position or change of angle is not possible in this way. In addition, angular adjustments are labor-intensive and time-intensive, due to the required resetting of the burner lance in the recess.

A burner holder having a complicated design is described in EP 2 687 800 A1. The known burner holder includes, in the holding segment, a parallel crank drive by which the holder for the burner lance is connected to a mounting segment that is situated underneath the burner port.

SUMMARY OF THE INVENTION

An object of the present invention is therefore to provide a less complicated device that enables a change of an angle of the burner lance in a simple and reproducible manner. In particular, the change of the angle is to be enabled without readjusting the burner lance. In addition, direct contact between the burner lance and the interior of the melt tank is to be avoided.

According to the present invention, the burner holder has a holding unit for fastening or mounting the burner lance, and a sealing plate for fastening the burner holder on the glass melting plant (i.e., the melt tank). In addition, the sealing plate is provided with a recess for accommodating the head of the burner lance, the recess forming at least a part of a passage through the sealing plate, and the retaining unit being connected to the sealing plate via at least one first pivot bearing about which the retaining unit can be rotated or pivoted about a first axis of rotation, the pivot bearing being attached or embedded directly on the sealing plate, or being connected to the sealing plate via a support arm situated on the sealing plate. The length of the support arm is determined by the radius of the head of the burner lance to be fastened on the glass melting plant with the burner holder; preferably, the length of the support arm is in the range from 100 mm to 1000 mm, particularly preferably between 100 mm and 600 mm. The external shape of the head of the burner lance is usually realized as a hemisphere, in order to ensure rotatability of the burner lance head in the recess of the sealing plate.

Through its spherical disk-shaped segment, the recess is adapted to the shape of the head of the burner lance, so that the hemispherical head of the burner lance essentially seals the passage when it is fitted into the recess with a nonpositive fit. This fit prevents undesired air from moving through a too-large gap between the head and the recess into a combustion chamber of the glass melting plant.

Here, a spherical disk is a part of a complete sphere that is cut out by two parallel planes. It is rotationally symmetrical relative to an axis of rotational symmetry that runs perpendicular to the two parallel planes. The limits of the spherical disk at the two parallel planes form two ends of the spherical disk. In the sense of the present application, a recess also counts as a recess having the basic shape of a spherical disk when its shape is close to that of a spherical disk. In particular, it is sufficient if the two planes forming the ends are nearly parallel, for example being inclined to one another by approximately 10°.

As explained above, the head of the burner lance usually has a tip that at least in some parts has the shape of a hemisphere. In the present invention, it is provided that a midpoint of the curvature of the head of the burner lance and the midpoint of the curvature of the spherical disk-shaped segment of the recess are situated one over the other when the burner lance is mounted on the burner holder according to the present invention. In this sense, the midpoint of the curvature of the head is also situated in the midpoint of the curvature of the spherical disk-shaped segment of the recess when a smallest spacing between the curvature midpoints is a maximum of 20% of the curvature radius of the segment of the recess, particularly preferably a maximum of 10%, most preferably a maximum of 5% (see FIG. 5a and the explanations below).

According to the present invention, the midpoint of the curvature of the spherical disk-shaped segment of the recess is situated essentially on the first axis of rotation. When setting up and mounting the burner lance on the burner holder, the holder is situated such that the midpoint of the curvature of the hemispherical tip lies essentially on the midpoint of the curvature of the spherical disk-shaped segment of the recess, so that the fit between the head and the recess is maintained even when the retaining unit and the burner lance mounted thereon are rotated about the first axis of rotation.

In this sense, the first axis of rotation also extends through the midpoint of the curvature of the spherical disk-shaped segment of the recess when a smallest distance of the first axis of rotation from the midpoint of the curvature is a distance of a maximum of 20% of a radius of curvature of the recess, particularly preferably a maximum of 10%, most preferably a maximum of 5%, and/or when, due to tolerances, a midpoint of the curvature of the recess cannot be precisely determined.

In an exemplary embodiment, the sealing plate has two support arms that each form a first pivot bearing together with the retaining unit. The first pivot bearing is fashioned on the support arms at each location where the retaining unit is rotatably connected to the respective support arm. Therefore, the support arms are situated such that they are at a distance from one another along the first axis of rotation.

The at least one support arm is either made in one piece with the sealing plate or is fastened fixedly thereon, preferably detachably.

In an exemplary embodiment, the at least one support arm extends essentially perpendicular to the surface of the sealing plate; in particular, the support arm extends perpendicularly from the surface of the sealing plate facing away from the quarl. Correspondingly, the first axis of rotation is situated at a specified distance from the surface of the sealing plate facing away from the quarl, and is preferably oriented parallel to this surface. The distance results due to the distance of the first pivot bearing from this surface.

The recess for accepting the head of the burner lance forms at least a part of the passage through the sealing plate. An outer end of the recess, on an external side, forms an outer opening of the passage. An inner opening of the passage is formed on an inner side of the sealing plate, situated opposite the outer side. The passage extends through the sealing plate, between the outer opening and the inner opening.

Preferably, the recess tapers, at least in a segment, in the direction from the outer opening to the inner opening. In particular, a wider end of the recess can form the outer opening of the passage.

If the recess forms the entire passage (i.e., not only a part of the passage), then the inner opening is formed by an inner end of the recess, situated opposite the outer end.

If the recess forms only a part of the passage, then a channel connects the inner end of the recess to the inner opening. In this case, the recess and the channel together form the passage. Preferably, the channel is made rotationally symmetrical about a channel axis. The channel can be for example cylindrical or conical.

The sealing plate is made such that the passage opens into or goes over into a burner port of the glass melting plant when the sealing plate is fastened on the glass melting plant. More precisely, it is provided that the inner side of the sealing plate faces the glass melting plant, and the inner opening opens into the burner port. In particular, the burner port can be made in a quarl of the glass melting plant, and the inner side of the sealing plate can lie on an outer side of the quarl. Preferably, the inner opening is adapted to the shape and/or size of the burner port; particularly preferably, the transition does not have a step. In particular, the diameter of the passage at the inner side of the sealing plate is equal to the diameter of the burner port at the outer side of the quarl. The sealing plate (and the quarl) shield the burner lance from the interior chamber of the melt tank. In this way, an accumulation of dust and condensate from the atmosphere of the melt tank is prevented, or does not come into contact with the burner lance.

The burner lance can preferably be mounted in detachable fashion on the retaining unit, the retaining unit being fastened on the sealing plate so as to be capable of rotation about a first axis of rotation, as described above. Depending on the design of the head and of the sealing plate, a nozzle of the head of the burner lance that is situated on a head-side end of the burner lance can then extend into the passage of the sealing plate. In this case, fuel exiting from the nozzle moves through the inner opening of the sealing plate into the combustion chamber of the glass melting plant. However, it is also possible for the head and the sealing plate to be made such that the head of the burner lance extends far enough into the recess that the front end of the head of the burner lance extends up to the plane of the inner side of the sealing plate. This is the case in particular when the recess alone forms the passage; this means that no channel (segment) is provided in the passage of the sealing plate. Fuel exiting from the fuel outlet of the head of the burner lance then moves directly into the burner port of the glass melting plant.

If the burner lance is mounted on the retaining unit, as is provided according to the present invention, and is held by this unit, then the burner lance can be rotated with the retaining unit about the first axis of rotation. The first axis of rotation preferably runs horizontally, but it can also run in any other direction. Because the retaining unit is fastened on the sealing plate directly or via a short support arm—for example by means of one or more pivot bearings—so as to be rotatable about the first axis of rotation, the retaining unit and, with it, a burner lance mounted on the burner holder are guided around the first axis of rotation during the rotation. The first angle of rotation, or pivot angle, of the retaining unit relative to the sealing plate about the first axis of rotation is for example a maximum of 90°, particularly preferably a maximum of 60°. Because the first axis of rotation is situated in the area of the recess of the sealing plate, or close to the recess, and runs through the midpoint of the curvature of the burner head, the position of the head of the burner lance in the recess remains at least substantially unchanged, apart from the rotation about the first axis of rotation. In addition, the fit between the head and the recess after the rotation of the retaining unit about the first axis of rotation is ensured by the shape of the head of the burner lance. That is, when a first angle of rotation of the burner lance about the first axis of rotation has to be changed for process-related reasons, then the retaining unit, together with the burner lance, can easily be rotated by the required angle without having to refit the head of the burner lance into the recess of the sealing plate. After the rotation by the required angle about the first axis of rotation, the retaining unit is arrested in such a way that the burner lance cannot move during the operation of the glass melting plant.

Differing from conventional burner holders, according to the present invention the sealing plate itself forms a part of the burner holder. Through the rotatable fastening on the sealing plate, the retaining unit, and thus the burner lance, are guided securely and precisely during the rotation about the first axis, in particular relative to the burner port.

The burner lance does not have to be removed from the recess in order to adjust the first angle of rotation of the retaining unit, or the burner lance, about the first axis of rotation. Correspondingly, after the rotation it does not have to be completely newly set up or readjusted. According to the present invention, it is sufficient to adjust and orient the burner holder, with the sealing plate and the retaining unit connected thereto, once when the burner holder is fastened on the glass melting plant. Here, the sealing plate, preferably on the first pivot bearing, is connected to the base of the glass melting plant with a fastening device in order to fix the position of the sealing plate permanently relative to the glass melting plant. After the fixing of the position of the sealing plate, only a rotation about the first axis of rotation, via the at least one first pivot bearing, is required to change the position of the burner lance, for example with regard to the vertical angle of rotation (the first axis of rotation runs horizontally in this exemplary embodiment). According to the present invention, the retaining unit is not connected to the glass melting plant separately from the sealing plate, but rather to a certain extent is suspended on the sealing plate and is borne by the sealing plate via the pivot bearing of the first axis of rotation.

The proposed burner holder makes it possible to quickly optimize the process conditions, and avoids downtime.

In addition, due to the guiding on the sealing plate, the holder is mechanically simple compared to the existing art. The proposed burner holder has only a few components and can therefore be produced easily, quickly, and economically. Due to the small number of components, it is comparatively robust against outside influences. This is a further advantage of the solution according to the present invention, due to the high thermal loading resulting from the proximity to the glass melting plant.

In an exemplary embodiment of the burner holder, the retaining unit has a holder plate that is connected to the pivot bearing via at least one support arm. A preferably groove-shaped receiving device for the burner lance is fastened fixedly, preferably detachably, on the holder plate. In an exemplary embodiment, a clamping ring is provided on the receiving device, by which ring the burner lance can be fastened on the receiving device. The receiving device preferably extends parallel to a longitudinal axis of the recess of the sealing plate, or parallel to a longitudinal axis of the burner lance when the lance is in place on the retaining unit. Other possibilities for fastening the burner lance on the retaining unit are of course also possible. The advantage of using a clamping ring is that when the burner holder is first configured on the glass melting plant, the burner lance can be pushed in the direction of its longitudinal axis until its head comes to lie on the recess of the sealing plate in sealing fashion. Subsequently, the clamping ring is drawn together, or a set screw that goes through the clamping ring is screwed into the clamping ring, in order to fasten the burner lance on the clamping ring and thus on the retaining unit. After the fastening to the clamping ring, or some other attachment to the retaining unit, the burner lance moves together with the retaining unit.

The proposed burner holder may be used, in particular, for all glass melting plants that are operated with underbank firing. This holds for side-fired glass melting plants having a plurality of burner ports, each equipped with a plurality of burner lances, and also for so-called end-fired furnaces, having two preheating chambers and burner ports situated next to one another in the firing tank at the rear side.

Preferably, the sealing plate is made such that when fastened on the glass melting plant it lies directly on an outer side of the quarl of the glass melting plant having the burner port.

In a further exemplary embodiment of the present invention, the burner holder, as indicated above, has a fastening device for the sealing plate with which the sealing plate can be fastened on a base of the melt tank of the glass melting plant (e.g., the steel structure of the glass melting plant). The fastening device holds the sealing plate on an area of the outer side of the wall of the glass melting plant having the burner port. In other words, the sealing plate, when it is fastened on the glass melting plant by the fastening device, lies directly on the outer side of the glass melting plant, in an area of the outer side in which the burner port is situated. In particular, the fastening device can be made such that it can hold the sealing plate directly on an outer side of the quarl having the burner port. The fastening device is for example fashioned as a support arm that is connected to the first pivot bearing of the sealing plate and holds this bearing on the outer side of the glass melting plant, e.g., on its base.

Alternatively or in addition, the sealing plate can be capable of being fastened immediately on the wall of the glass melting plant having the burner port, particularly preferably at the quarl having the burner port.

In a development of the present invention, the retaining unit is removably fastened on the sealing plate. This facilitates assembly as well as maintenance and repair work. In addition, a wear plate can be provided between the sealing plate and the quarl. This wear plate is held on the quarl by the sealing plate. This significantly simplifies an exchange of the sealing plate (or of the wear plate), which is subject to strong thermal loading during operation of the glass melting plant. The wear plate can easily be exchanged if it is damaged by the high thermal loading due to the operation of the glass melting plant.

In a development of the present invention, the sealing plate is realized as a cooling plate, preferably having cooling ribs and/or cooling grooves, the cooling ribs and/or cooling grooves being situated on the side of the sealing plate facing away from the quarl. Alternatively or in addition, a cooling device can be provided on and/or in the sealing plate. This significantly reduces the thermal loading of the burner lance, in particular the head of the burner lance. The cooling device can be designed for example as a water cooling system guided through the sealing plate and/or as an air cooling system provided on the sealing plate. The cooling device designed as an air cooling system, for example, causes air to flow against the sealing plate from below.

In a further advantageous exemplary embodiment of the present invention, the sealing plate, or the support arm situated thereon, has a first bearing element (e.g., a bearing bushing) and the retaining unit has a second bearing element (e.g., a bearing shaft), the first bearing element and the second bearing element interacting and forming the first pivot bearing via which the retaining unit is fastened on the sealing plate so as to be capable of rotation about the first axis of rotation. Because the retaining unit and the sealing plate together form the pivot bearing, comparatively few parts and little space are required. In addition, connection, separation, and, if warranted, reconnection of the retaining unit and the sealing plate are simplified. In an exemplary embodiment, first bearing elements are situated on the outer side of the sealing plate on each of two opposite sides of the recess, and the retaining unit has two second bearing elements, one of the first bearing elements and one of the second bearing elements together forming a first pivot bearing in each case. The distance of each bearing element from the mid-axis of the recess is preferably 80 mm to 400 mm, particularly preferably 80 mm to 250 mm.

In an exemplary embodiment, the burner holder in addition has a hinged support (i.e., a stabilizing strut, in the form of a compression strut) and an actuating drive for rotating the retaining unit about the first axis of rotation, an end of the hinged support facing the retaining unit being connected to the retaining unit and an opposite end of the hinged support being connected to the actuating drive. The actuating drive can also be realized as a further hinged support. The retaining unit and, if warranted, the burner lance mounted thereon can be rotated about the first axis of rotation by the actuating drive. Thus, rotation by hand is not required. The hinged support simplifies the handling of the burner mount and makes it more economical. The hinged support can be connected to the retaining unit at a point situated opposite the end of the retaining unit connected to the sealing plate. Preferably, the connection of the hinged support to the retaining unit is made via a first joint, and/or the connection of the hinged support to the actuating drive is made via a second joint. With the hinged support, linear movements of the actuating drive are converted into rotational movements of the retaining unit about the first axis of rotation. The actuating drive is preferably realized as a linear drive. In an exemplary embodiment, a cardan joint on the hinged support makes it possible to attach this support at some distance from a central longitudinal axis of the retaining unit, preferably of the holder plate. The hinged support brings about the rotational or pivoting movement of the retaining unit about the first axis of rotation through the at least one first pivot bearing, for example in the vertical direction if the axis of rotation runs horizontally.

In a particularly preferred exemplary embodiment of the present invention, the actuating drive is realized pneumatically and/or electrically. A pneumatic electrical actuating drive is particularly well-suited for the high thermal load in the immediate vicinity of the glass melting oven. An electrical actuating drive is particularly simple and economical to implement. In addition, precisely reproducible fine settings of a rotational position of the retaining unit can more easily be achieved with an electric motor. Alternatively, a manual adjustment of the retaining unit, or the use of a manually operated adjusting device connected to the retaining unit, instead of the actuating drive is of course also possible.

In a further, particularly preferred exemplary embodiment, the burner holder has a control unit for controlling the actuating drive. Most preferably, the control unit enables a remotely controlled and/or automated controlling of the actuating drive. In this way, the adjustment can be simplified and optimized. Moreover, a remotely controlled and/or automated controlling of the actuating drive contributes to operational safety when the adjustment has to take place during the firing of the glass melting plant, because a person does not then have to enter into the vicinity of the hot burner port in order to make the adjustment.

In a further advantageous exemplary embodiment of the present invention, the burner holder has a second pivot bearing by which the burner lance, when it is mounted on the retaining unit, can be rotated or pivoted about a second axis of rotation, the second axis of rotation running at an angle to the first axis of rotation. That is, the second axis of rotation does not run parallel to the first axis of rotation. The second angle of rotation of the rotation of an element of the retaining unit, for example the receiving device for the burner lance, about the second axis of rotation relative to the sealing plate is for example a maximum of 50°, preferably a maximum of 30°. A degree of play in which the mounted burner lance can move in the recess is therefore not limited to rotation about the first axis of rotation. In particular, a superposition of the rotation about the first axis of rotation and the rotation about the second axis of rotation is possible.

If the recess has the shape of a spherical disk at least in some segments, then it is advantageous that both the first axis of rotation and the second axis of rotation extend through the midpoint of the curvature of the spherical disk-shaped segment of the recess of the sealing plate. The midpoint of the curvature of the recess thus corresponds to a point of rotation for a rotation of the retaining unit (and possibly the burner lance mounted thereon) about the first axis of rotation and/or the second axis of rotation. In particular, if the mounted burner lance has a tip having the basic shape of a hemisphere, it is ensured that during the rotation the head always remains fitted into the recess, independent of whether the rotation is taking place about the first axis of rotation and/or the second axis of rotation.

Particularly preferably, at least a part of the second axis of rotation is provided on an end of the retaining unit facing the sealing plate. In this way, a secure fixing of the second axis of rotation is ensured relative to the head of the burner lance, which may be mounted on the retaining unit. In an exemplary embodiment, a third bearing element (e.g., in the form of a bearing bushing) is provided in the holding plate of the retaining unit, and a fourth bearing element (e.g., a bearing shaft) is provided on the preferably groove-type receiving device, which together form the second pivot bearing and act together to rotate or to pivot the burner lance, mounted on the retaining unit, about the second axis of rotation. Alternatively to the third and fourth bearer element, for the rotation or pivoting about the second axis of rotation, at least one curved oblong hole can be provided in the holder plate, a holding pin protruding from the receiving device being guided in each oblong hole. For example, the second axis of rotation can run vertically, so that the receiving device can be rotated horizontally about the second axis of rotation. After the rotation about the second axis of rotation by the required angle, in order to influence the process conditions in the glass melting plant the retaining unit is arrested in such a way that the burner lance cannot move during the operation of the glass melting plant. Preferably, the angle of the retaining unit relative to the second axis of rotation is set once during the setting up of the burner lance, so that only the angle of rotation about the first axis of rotation is modified in order to optimize the combustion in the melting tank.

In a further, particularly advantageous exemplary embodiment of the burner holder according to the present invention, the second axis of rotation runs orthogonal to the first axis of rotation. If the first axis of rotation and the second axis of rotation run orthogonal to one another, the amount of movement play of the mounted burner lance is particularly large. In particular, the first axis of rotation can extend in a horizontal direction and the second axis of rotation can extend perpendicular to the first axis of rotation in a vertical direction (parallel to a direction of the force of gravity).

The object indicated above is also achieved by a system having a burner holder and burner lance as described above, the burner lance being fastened on the retaining unit in such a way that the head of the burner lance is situated in the recess of the sealing plate and lies on the inside of the recess. As explained above, the head of the burner lance preferably has a tip that at least in some segments has a hemispherical shape. Of course, the tip does not have to be precisely hemispherical in shape. For example, the shape of the tip can differ from a hemisphere due to a nozzle for emitting fuel, or due to cooling ribs, cooling grooves, engagement elements for screwing or unscrewing the head, and/or manufacturing tolerances. This system ensures a particularly good, reliable, and precise interaction of the burner holder and the burner lance, because the burner holder and the burner lance are matched to one another. Of course, the burner holder of the system can also have features of the other described exemplary embodiments, as long as they do not contradict the last-described exemplary embodiment.

In a further advantageous exemplary embodiment, the glass melting plant on which the burner holder according to the present invention is fastened is a side-fired glass melting plant. It can have at least two burner ports, and each burner port may be equipped with at least two burner lances.

In still another advantageous exemplary embodiment, the glass melting plant has an end-fired furnace having two pre-heating chambers and burner ports situated next to one another in the furnace, at the rear.

In order to fasten a burner lance on a glass melting plant, in particular using one of the above-described exemplary embodiments of the burner holder, the following steps are preferably carried out:
fastening a sealing plate, having a recess for receiving a head of a burner lance, on the glass melting plant (i.e., the melt tank), the recess forming at least part of a passage through the sealing plate, an inner opening of the passage of the sealing plate opening into a burner port in an outer side of the glass melting plant, and another end of the recess forming an outer opening of the passage;
fastening a retaining unit on the sealing plate so that the retaining unit can be rotated about a first axis of rotation via the first pivot bearing; and
mounting (fastening) the burner lance on the retaining unit, a head of the burner lance extending into the recess of the sealing plate, so that fuel exiting from an end at the head of the burner lance can move through the burner port into a combustion chamber of the glass melting plant.

In particular, the method can be used to fasten a burner lance on the glass melting plant using a burner holder as described above and/or using a system as described above.

The exemplary embodiments and advantages stated for the burner holder as described above hold correspondingly for the system according to the present invention.

BRIEF DESCRIPTION OF THE DRAWINGS

In the following, the present invention is explained on the basis of exemplary embodiments, with reference to the Figures. All described and/or graphic features, in themselves or in any combination, form the subject matter of the present invention, independently of their summarization in the claims or the relations of dependence therein.

FIG. 6 shows a second exemplary embodiment of a burner holder according to the present invention with a burner lance, and a segment of the wall of the glass melting plant, in a view from the side, and in partial section;

DETAILED DESCRIPTION OF THE PREFERRED EMBODIMENTS

Figure 1:
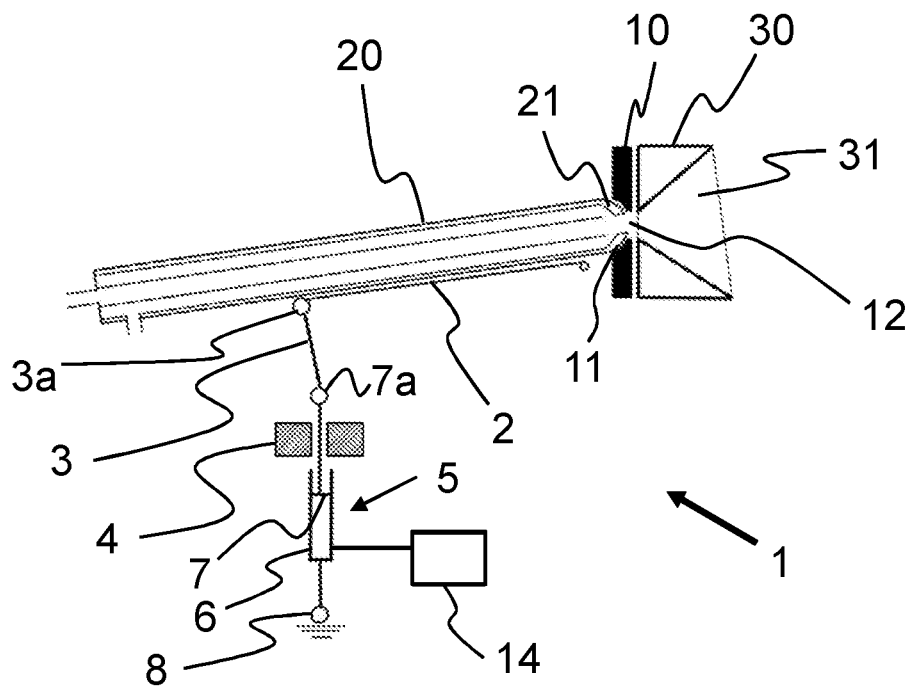
FIG. 1 shows a first exemplary embodiment of a burner holder according to the present invention having a burner lance mounted thereon, in a longitudinal section, in a view from the side.

Burner holder 1 shown in FIG. 1, according to a first exemplary embodiment of the present invention, intended to illustrate the principle of the present invention, is made up of a retaining unit 2, in the form of a holder plate, and a sealing plate 10. A burner lance 20 is fixedly mounted on retaining unit 2, burner lance 20 not being per se a component of burner holder 1. Burner lance 20 and retaining unit 2 together form the system according to the present invention. In addition to burner holder 1 and burner lance 20, in addition a quarl 30 of a glass melting plant, having a burner port 31, is shown in section.

Sealing plate 10 is seated, with a nonpositive fit, with its inner side on an outer side of quarl 30 that faces away from a combustion chamber of the glass melting plant (melt tank). The fastening of sealing plate 10 on quarl 30 is done by means of a fastening device 8a that is connected to quarl 30 or a base of the glass melting plant. A recess 11, which has the shape of a spherical disk at least in some segments, is provided in an outer side of sealing plate 10 situated opposite quarl 30. A channel 12 is connected to spherical disk-shaped recess 11. Spherical disk-shaped recess 11 and channel 12 together form a passage 11, 12 that goes through sealing plate 10. A wide end of spherical disk-shaped recess 11 on the outer side of sealing plate 10 provides an outer opening of passage 11, 12. Channel 12 forms an inner opening of passage 11, 12 on the inner side of sealing plate 10. The inner opening of passage 11 opens into burner port 31.

Burner lance 20 conducts fossil fuel to the combustion chamber of the glass melting plant. A substantially rounded, preferably half-round, head 21 of burner lance 20 is fitted into recess 11 with a nonpositive fit. Fuel exits from a nozzle in head 21 of burner lance 20, and moves through channel 12 and burner port 31 into the combustion chamber of the glass melting plant, in order to heat this chamber after/through combustion.

Figure 2:
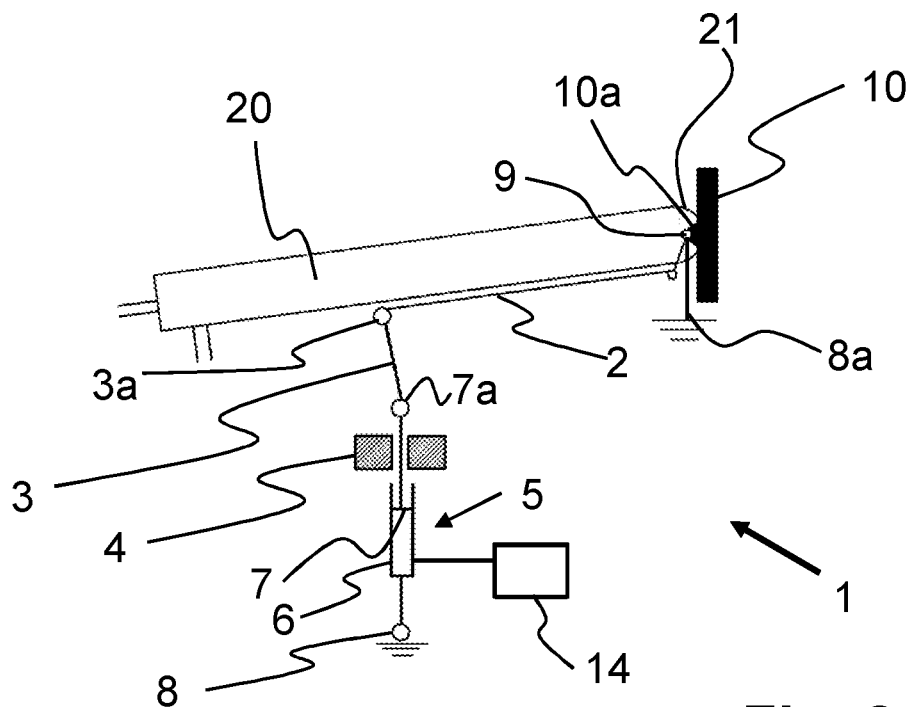
FIG. 2 shows the burner holder according to FIG. 1, in a view from the side.
Figure 3:
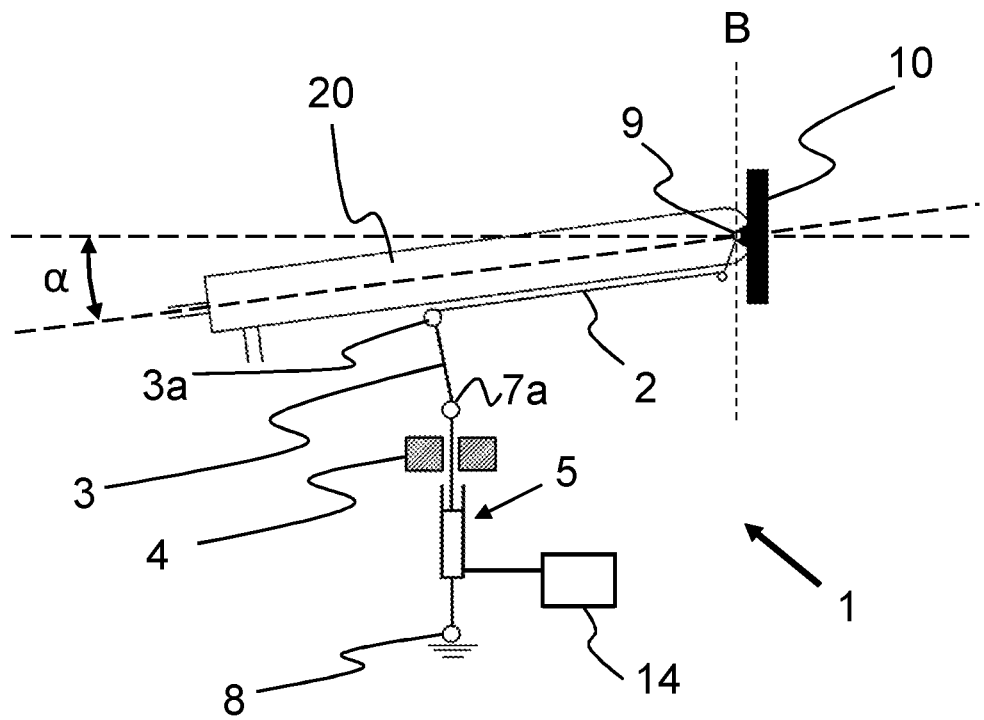
FIG. 3 shows the burner holder according to FIG. 1 in another view from the side, illustrating a first angle of rotation.
Figure 4:
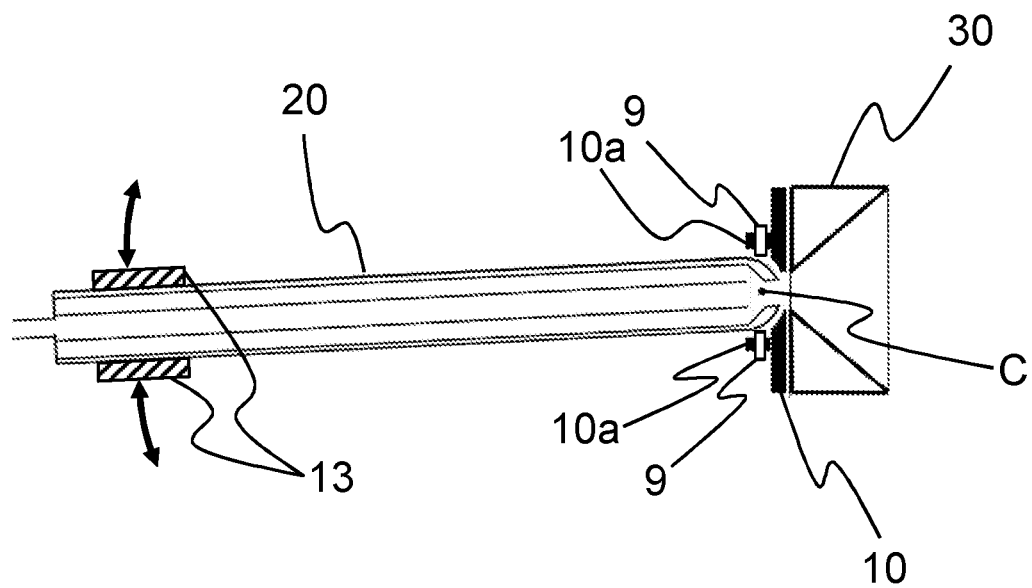
FIG. 4 shows the burner holder according to FIG. 1 in a longitudinal section, in a view from above.

In FIGS. 2 and 4, it can be seen that holder plate 2 of burner holder 1 is fastened on sealing plate 10 of burner holder 1 via two first pivot bearings 9 situated horizontally next to one another. Each first pivot bearing 9 is connected directly to sealing plate 10. For this purpose, sealing plate 10 is provided with two bearing bushings at each support arm 10a situated laterally on sealing plate 10 and made in one piece therewith. Support arms 10a are situated opposite one another next to the outer opening of recess 11. Retaining unit 2 forms, at its end at the sealing plate, two corresponding bearing shafts situated opposite one another, each bearing shaft working together with the respectively associated bearing bushing of sealing plate 10. One of the bearing bushings of sealing plate 10, and one of the bearing shafts of retaining unit 2, work together in each case as a first pivot bearing 9. Via first pivot bearing 9, retaining unit 2 and with it burner lance 20 can be rotated in the vertical direction relative to sealing plate 10, about the horizontally running first axis of rotation A (see FIG. 5) by a first angle of rotation α (see FIG. 3).

In addition, FIG. 2 shows that a hinged support 3 supports retaining unit 2 from below. Hinged support 3 connects an end of retaining unit 2 that points away from sealing plate 10 to a pneumatic actuating drive 5. Hinged support 3 is fastened to retaining unit 2 via a first joint 3a. In actuating drive 5, a piston 7 is displaced in a cylinder. A piston rod connects piston 7 to a lower, second joint 7a of hinged support 3. A bearing 4 guides the piston rod in the vertical direction. Actuating drive 5 is fixedly connected to the base (e.g., the steel structure) of the melt tank of the glass melting plant by a fastener 8. Bearing 4 is also fixedly connected to the glass melting plant.

The piston rod is moved in the vertical direction, i.e. upward or downward, by actuating drive 5. Because the end of retaining unit 2 facing away from sealing plate 10 is connected to actuating drive 5 via hinged support 3, the end of retaining unit 2 facing away from sealing plate 10 is also moved upward or downward by actuating drive 5. When the end of holder plate 2 facing away from sealing plate 10 is lifted or lowered, retaining unit 2 rotates by an angle α (see FIG. 3) in the vertical direction about horizontally running first axis of rotation A (see FIG. 5), due to the fastening of holder plate 2 on sealing plate 10 via pivot joints 9.

As is shown in FIG. 2, actuating drive 5 can be connected to a control device 14. Using control device 14, actuating drive 5 can be remotely controlled and/or automatically controlled. Instead of pneumatic actuating drive 5, for example an electrical actuating drive can also rotate retaining unit 2 in the vertical direction, as described above. Alternatively, the rotation can be done manually.

FIG. 3 shows that first angle of rotation α of holder plate 2 can be set, or adjusted, in a vertical direction by actuating drive 5. In this way, at the same time first angle of rotation α for burner lance 20 on holder plate 2 is set, or adjusted. The rotation takes place about the horizontal first axis of rotation A (see FIG. 5), which coincides with a longitudinal direction of the bearing shafts of first pivot bearing 9. In a particularly preferred exemplary embodiment, the midpoint of the curvature of recess 11, which has the shape of a spherical disk at least in some segments, and, if the burner lance is fastened on retaining unit 2, a midpoint of the curvature of head 21 of burner lance 20 coincide precisely with one another, and also lie on first axis of rotation A. As a result, head 21 of the burner lance always remains fitted in sealing fashion in spherical disk-shaped recess 11, even when there is a change of the first angle of rotation α. Burner lance 20 mounted on holder plate 2 can thus be rotated about first axis of rotation A, preferably continuously without steps, without head 21 afterwards having to be refitted into recess 11, which has the shape of a spherical disk at least in some segments.

Figure 5:
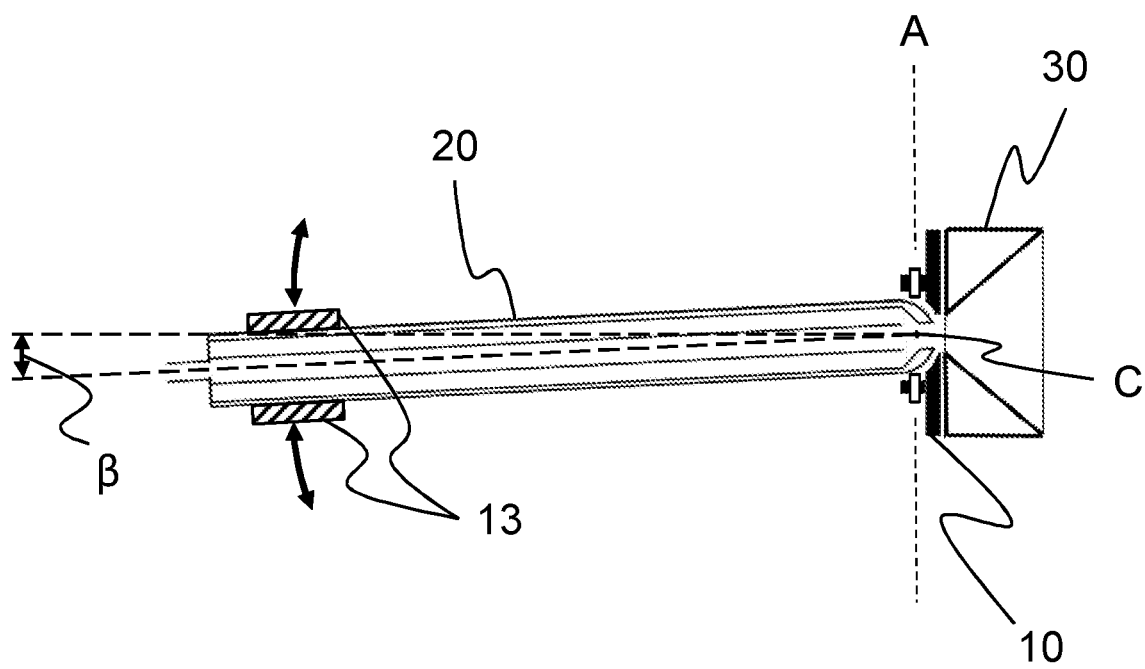
FIG. 5 shows the burner holder according to FIG. 1 in a longitudinal section, in a view from above, illustrating a second angle of rotation.

In FIG. 4 and FIG. 5, it can be seen that burner lance 20, having burner holder 1 according to the present invention, can in addition be rotated about a second, vertical axis of rotation B (see FIG. 3). A receiving device (not shown in more detail in FIGS. 1 through 5) of retaining unit 2 is connected, at its end facing away from head 21, to retaining unit 2 with a pivot mount 13. In addition, the receiving device of the retaining unit is mounted on retaining unit 2 at its front end so as to be capable of rotation, by a second pivot bearing. Pivot mount 13 of retaining unit 2 permits a preferably continuous adjustment of burner lance 20, fastened on the receiving device, about second axis of rotation B. More precisely, with burner holder 1 a second, e.g. horizontal, angle of rotation β (see FIG. 5) about second axis of rotation B of burner lance 20 can be set relative to sealing plate 10 and its recess 11.

The horizontal first axis of rotation A and vertical second axis of rotation B set in the exemplary embodiment of FIGS. 1 through 5 intersect at a point of rotation C (see FIGS. 4 and 5). Both the midpoint of the curvature of head 21 of burner lance 20 and the midpoint of the curvature of recess 11, which has the shape of a spherical disk at least in some segments, are preferably situated precisely in point of rotation C. Burner lance 20 mounted on holder plate 2 can therefore be rotated as desired about point of rotation C, about the two axes of rotation A, B, in a solid angle without head 21 afterwards having to be refitted into recess 11, which has the shape of a spherical disk at least in some segments.

Figure 5A:
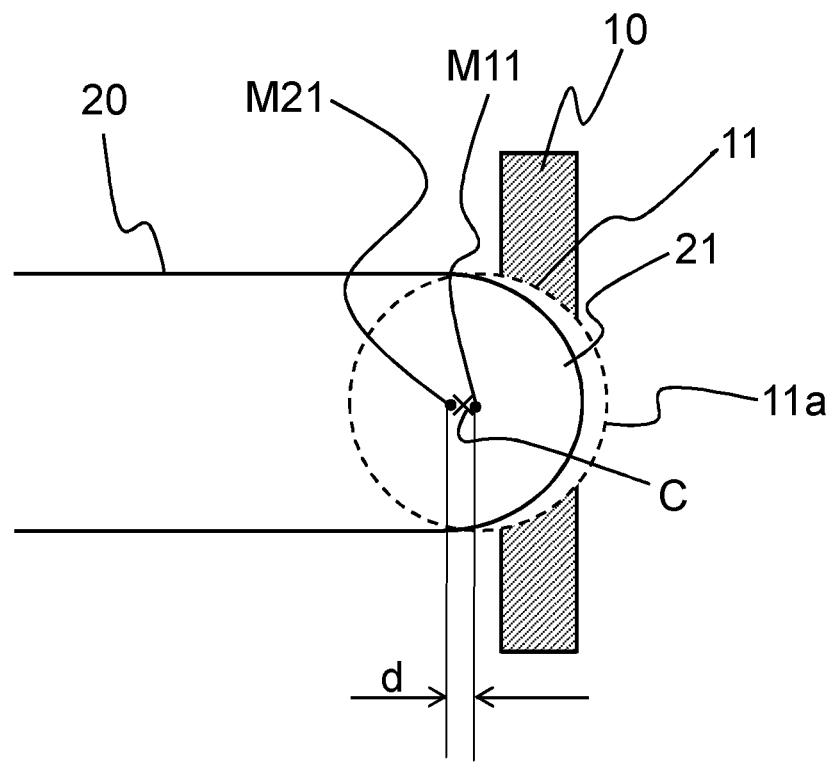
FIG. 5a shows the sealing plate of the burner holder according to FIG. 1 and the head of the burner lance, in a cross-section.
Figure 7:
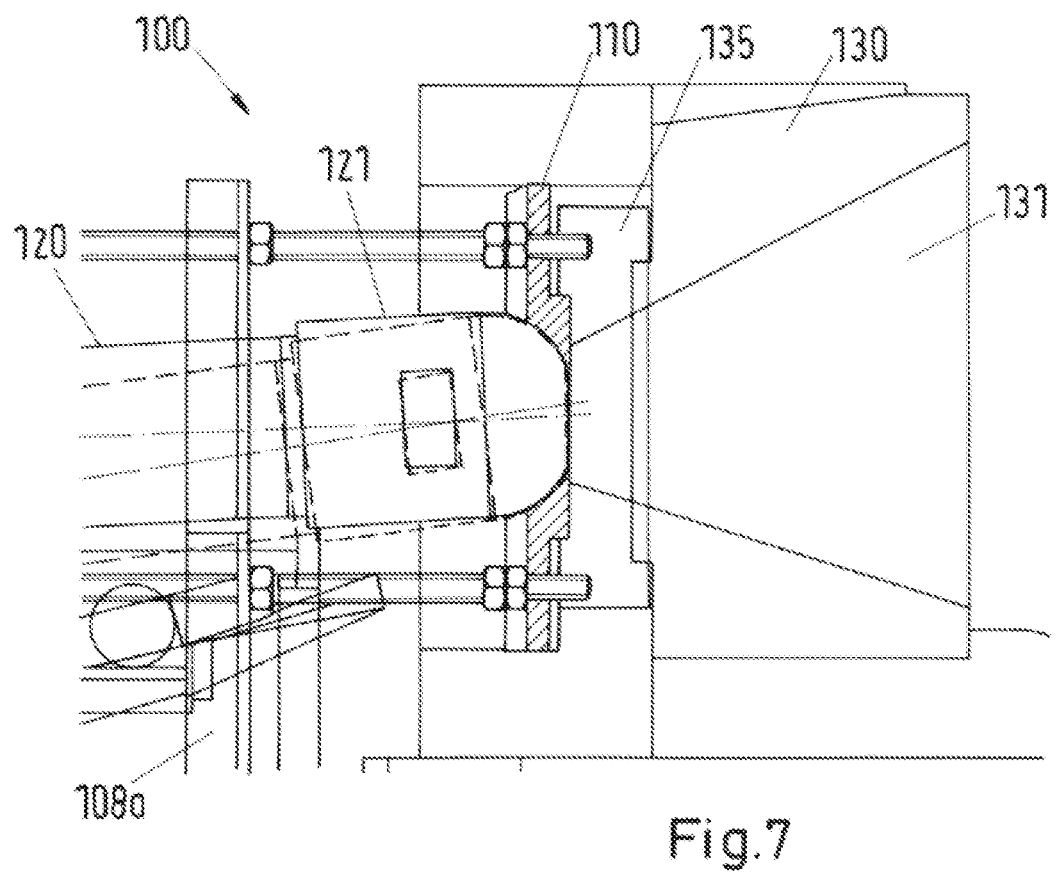
FIG. 7 shows a segment, facing the glass melting plant, of the burner holder and the burner lance according to FIG. 6, and a segment of the wall of the glass melting plant, in a view from the side and in partial section.
Figure 8:
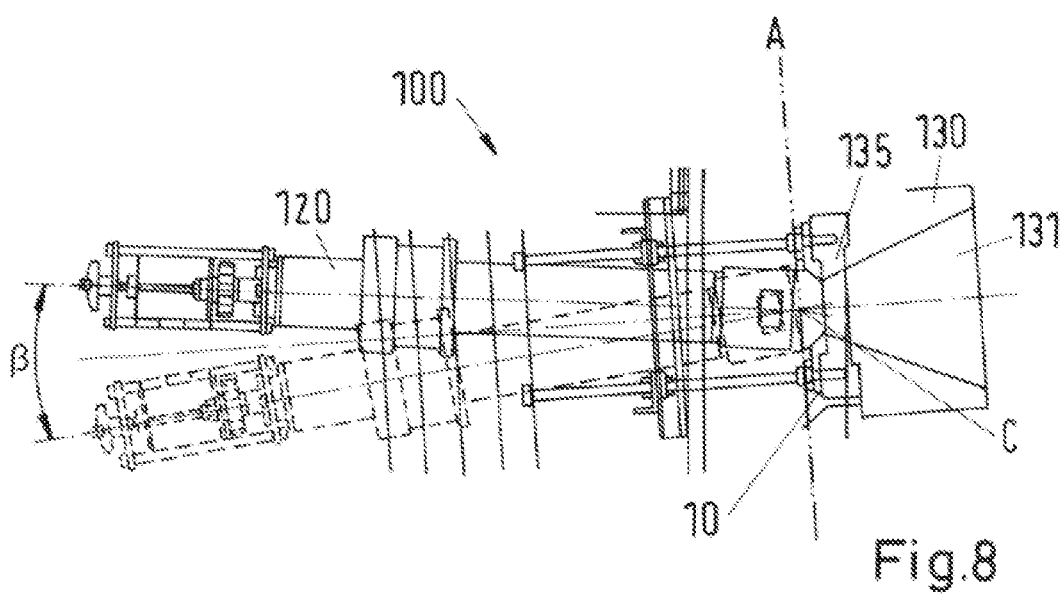
FIG. 8 shows the burner holder and the burner lance with a segment of the wall of the glass melting plant according to FIG. 6, in a view from above and in partial section.
Figure 9:
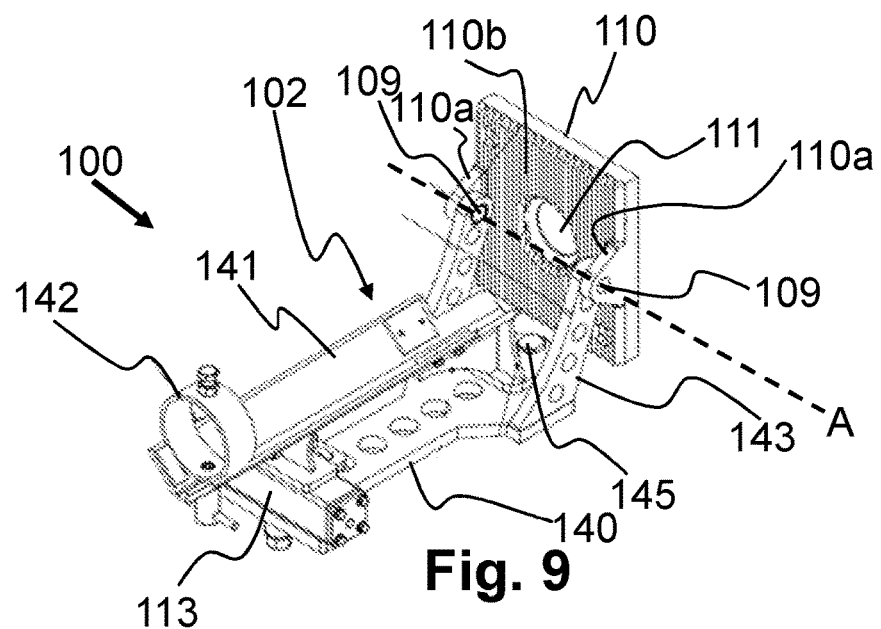
FIG. 9 shows the burner holder according to FIG. 6 in a perspective view from the side.

For example, due to manufacturing tolerances, as shown in FIG. 5a, curvature midpoint M21 of head 21 of burner lance 20 and curvature midpoint M11 of recess 11, having the shape of a spherical disk in some segments (the circle of intersection of the spherical disk is designated 11a in FIG. 5a), may not be situated precisely one over the other; i.e. at a distance d from one another. In this case, the point of rotation C, which the axes of rotation A, B form at their point of intersection, is situated in the vicinity of curvature midpoints M11, M21, or of one of these curvature midpoints M11, M21, or possibly also between the two curvature midpoints M11, M21. The distance d between the curvature midpoints M11, M21 is shown only schematically in FIG. 5a, in order to illustrate the principle. The actual distance d is significantly smaller.

As described above, a cooling device can be integrated into sealing plate 10. Preferably, the sealing plate can have cooling ribs.

Differing from conventional burner holders, according to the present invention sealing plate 10 forms a part of burner holder 1. Retaining unit 2 is reliably and precisely guided on the sealing plate even during rotation about first axis of rotation A, due to the rotational fastening on the sealing plate. In an exemplary embodiment, in addition rotation about a second axis of rotation B can also be realized. Because after the rotation it is not necessary to refit the head of the burner lance, which is connected fixedly to the retaining unit, the first angle of rotation α, and in an exemplary embodiment also the second angle of rotation β, can be adapted particularly easily and quickly. With the proposed burner holder, the process conditions can be optimized faster and downtime can be avoided. Because the retaining unit is fastened on the sealing plate and guided so as to be capable of rotation, a reproducible angular setting of the burner lance is possible even without a complex mechanical system.

A second exemplary embodiment of a burner holder 100 according to the present invention is shown in FIGS. 6 through 14. In its design, this exemplary embodiment is realized analogously to the exemplary embodiment shown in FIGS. 1 through 5, so that reference is made to this exemplary embodiment. The reference characters of the second exemplary embodiment correspond to the reference characters of the first exemplary embodiment, the reference characters of the second exemplary embodiment being larger by 100 in each case.

Burner holder 100 has a retaining unit 102 having a holder plate 140, a receiving device 141, a clamping ring 142, and a pivot mount 113. Receiving device 141 is fastened on holder plate 140 so as to be rotatable or pivotable about second pivot bearing 145. Clamping ring 142 is situated on the end of groove-shaped receiving device 141 situated opposite sealing plate 110, and is used to fasten burner lance 120, which is situated on receiving device 141 and is displaceable in the direction of its longitudinal axis, on receiving device 141. For this purpose, a set screw 147 that goes through clamping ring 142 is screwed into clamping ring 142. Clamping ring 142 is fastened on receiving device 141 so as to be capable of rotation. The angle of rotation of clamping ring 142 can be modified using the rod-shaped rotary handle 148.

Figure 10:
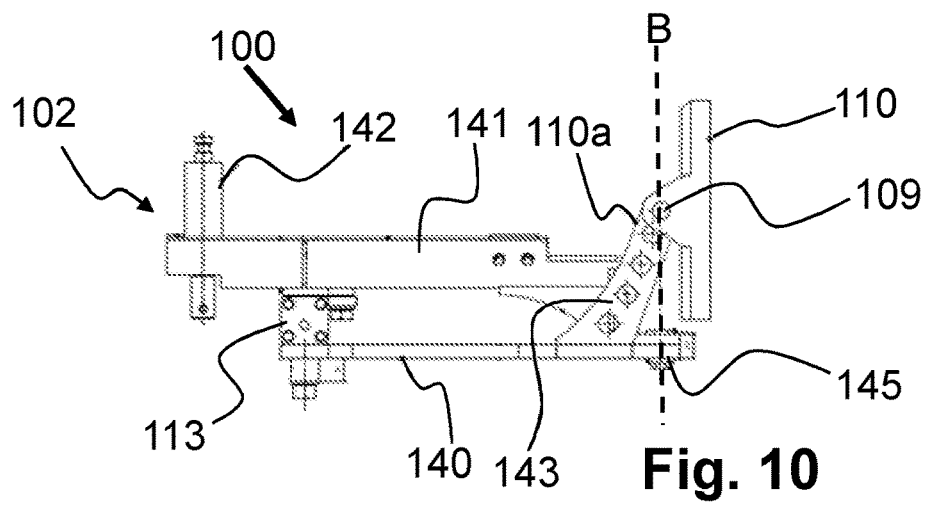
FIG. 10 shows the burner holder according to FIG. 6 in a view from the side.
Figure 11:
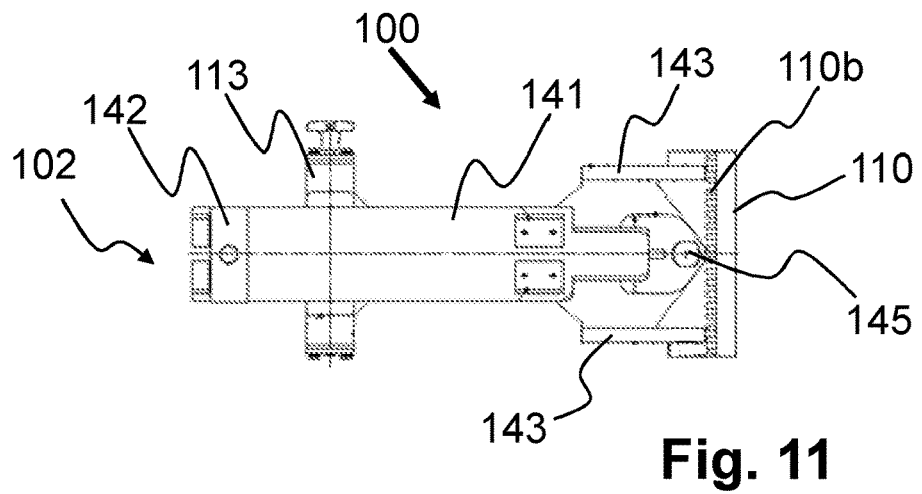
FIG. 11 shows the burner holder according to FIG. 6, in a view from above.
Figure 12:
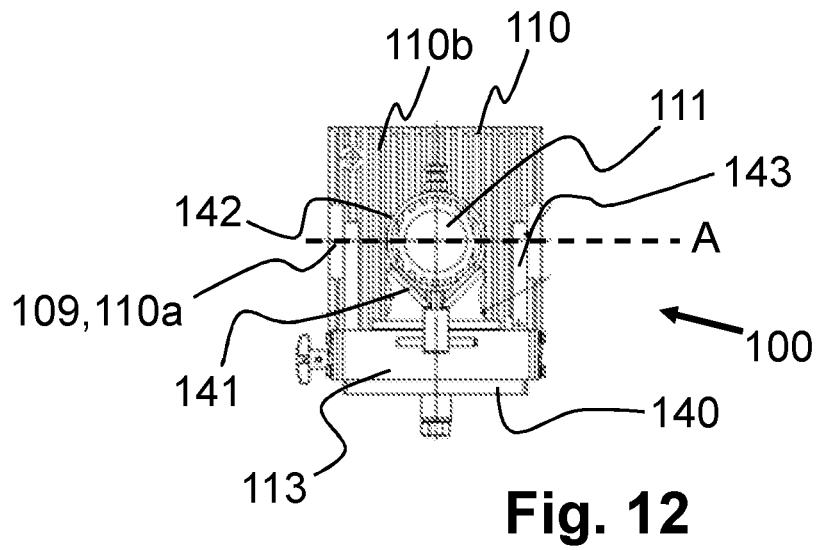
FIG. 12 shows the burner holder according to FIG. 6 in a view from the rear.
Figure 13:
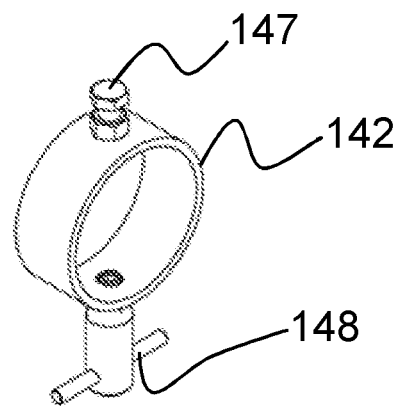
FIG. 13 shows a clamping ring of the burner holder according to FIG. 6, in a perspective view from the side.
Figure 14:
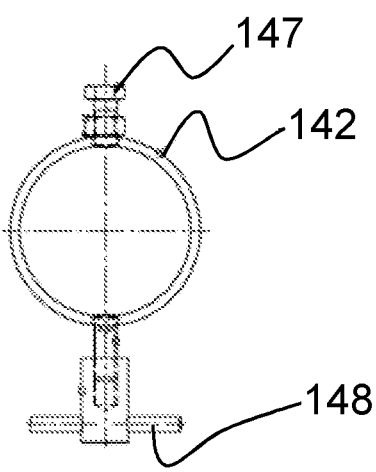
FIG. 14 shows the clamping ring according to FIG. 13, in a view from the front.

Using pivot mount 113, the rotation or pivoting of burner lance 120 situated on receiving device 141 about second axis of rotation 145 takes place in the horizontal direction (cf. FIG. 8) by the angle β. Second axis of rotation B runs vertically, as shown in FIG. 10. For this purpose, receiving device 141 is fastened on holder plate 140 so as to be rotatable about the second axis of rotation 145.

Alternatively to the configuration with axis of rotation 145 and pivot mount 113, receiving device 141 can have at least one holding pin that can be moved by the angle β along a correspondingly curved oblong hole. Correspondingly, receiving device 141, and burner lance 120 situated thereon, can be pivoted by the angle β about the imaginary second axis of rotation B. A curved oblong hole is provided for each holding pin, in which hole the respective holding pin, for example protruding vertically downward from receiving device 141, is guided. The at least one curved oblong hole is situated in holder plate 140, which preferably runs horizontally. When the burner holder is set up, receiving device 141 can be fastened on holder plate 140 by a screw connection situated on the respective holding pin, after the correct angle β has been set. This alternative specific embodiment is distinguished in that holder plate 140 can be made shorter in the direction of quarl 130, so that the end of holder plate 140 at the side of the quarl has a greater distance from quarl 130, and in this way the thermal load on holder plate 140 can be reduced. This specific embodiment is also advantageous if, for design reasons, the use of a burner holder according to the first exemplary embodiment (i.e., having a point of rotation at the end at the quarl) is not possible.

Holder plate 140 of retaining unit 102 is connected to sealing plate 110 in the area of first pivot bearing 109 via two support arms 143, each situated laterally on holder plate 140. Retaining unit 102 is suspended on sealing plate 110, and can be rotated in the vertical direction about first axis of rotation A, which runs horizontally (see FIG. 9), via first pivot bearing 109. This is shown in FIG. 6 by angle of rotation α.

In the second exemplary embodiment, sealing plate 110 has cooling ribs 110b, which run vertically, on the side facing away from quarl 130. In addition, a wear plate 135 is additionally provided between sealing plate 110 and quarl 130. This wear plate provides additional protection of sealing plate 110 against the thermal load from the combustion chamber of the glass melting plant.

Sealing plate 110 is connected to a base of the glass melting plant via a fastening device 108a. After the setup or adjustment of burner lance 120 on receiving device 141, fastening device 108a ensures a nonpositive connection between head 121 of burner lance 120 and sealing plate 110, or in recess 111 thereof.

Figure 15:
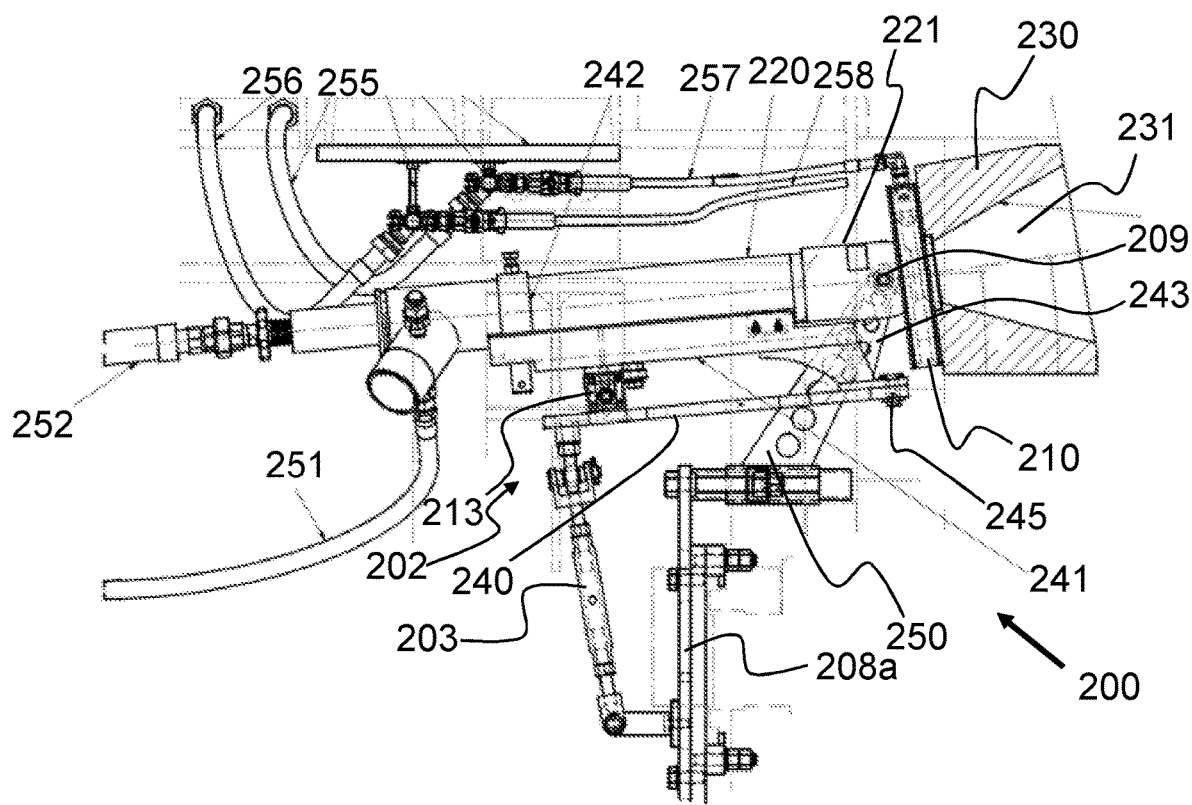
FIG. 15 shows a third exemplary embodiment of a burner holder according to the present invention with a burner lance, and a segment of the wall of the glass melting plant, in a view from the side, and in partial section.

The third exemplary embodiment, shown in FIG. 15, of a burner holder 200 differs from the second exemplary embodiment only in the design of sealing plate 210. The reference characters of the third exemplary embodiment correspond to the reference characters of the first and second exemplary embodiment, the reference characters of the third exemplary embodiment being larger in each case by 200 than the reference characters of the first exemplary embodiment, and larger by 100 than the reference characters of the second exemplary embodiment.

Sealing plate 210 has a water cooling system flowing through sealing plate 210, in order to reduce the thermal load of sealing plate 210 lying externally on quarl 230. The cooling water is supplied to or carried away from sealing plate 210 via lines 255, 256, 257, 258. Inside sealing plate 10, a pipeline, preferably routed for example in a serpentine shape, is provided that distributes the cooling water over the entire sealing plate 210.

In the exemplary embodiment shown in FIG. 15, the gas for the core nozzle of burner lance 220 is in addition supplied via a supply line 251, while a supply line 252 supplies the secondary gas to burner lance 220. The secondary gas is conducted in a pipe inside burner lance 220 so as to open out at head 221 of burner lance 220, and surrounds an internal pipe of burner lance 220 for the core gas flow. In this way, a graduated supply of gas can be set, with different gas quantities for the core flow and the outer sheath flow, which is used to further influence the process in the combustion chamber of the glass melting plant.

From FIG. 15, it can also be seen that, analogously to the first exemplary embodiment, the rotation of burner lance 220 about first axis of rotation A takes place via a hinged support 203 that at one side is situated at the end of holder plate 240 of the retaining unit 202 opposite sealing plate 210, and at the other side is connected to fastening device 208a. Hinged support 203 can be operated manually, or can also be operated automatically using an actuating drive not shown in FIG. 15.

In its upper segment, fastening device 208a has a support arm 250 that is connected to first pivot bearing 209 and that fastens this bearing, or sealing plate 210, on quarl 230, and connects it thereto with a nonpositive fit.

Burner holders 1, 100, 200, according to the present invention described above and shown in the Figures, enable a simple and rapid adjustment of the angle of the burner lance 20, 120, 220 attached on the respective burner holder 1, 100, 200 about a first axis of rotation A, and possibly also about a second axis of rotation B that runs at an angle to first axis of rotation A. Preferably, second axis of rotation B is oriented orthogonally to first axis of rotation A. After an adjustment of the angle, a readjustment of burner lance 20, 120, 220 in recess 11, 111, 211 is not required.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE CHARACTERS 1, 100, 200 burner holder
2, 102, 202 retaining unit
3, 103, 203 hinged support
3a first joint
4 bearing
5 actuating drive
6 cylinder
7 piston
7a second joint
8 fastening
8a, 108a, 208a fastening device
9, 109, 209 pivot bearing
10, 110, 210 sealing plate
110a support arm
110b cooling rib
11, 111, 211 recess
11a circle describing the curvature of recess 11
12 channel
13, 113 pivot mount
14 control unit
20, 120, 220 burner lance
21, 121, 221 head of the burner lance
30, 130, 230 quail
31, 131, 231 burner port
135 wear plate
140, 240 holder plate
141, 241 receiving device
142, 242 clamping ring
143, 243 support arm
145, 245 second axis of rotation
147 set screw
148 rotary handle for a fastening screw of clamping ring 142
250 support arm
251 flexible supply line for secondary gas (sheath flow)
252 flexible supply line for primary gas (core flow)
255, 256 pipelines for cooling water supply
257, 258 pipelines for cooling water return
A first axis of rotation
B second axis of rotation
C point of rotation
M11 midpoint of the circle describing the curvature of recess 11
M21 midpoint of the curvature of head 21 of burner lance 20
d spacing between midpoints M11 and M21
α first angle of rotation
β second angle of rotation

The invention claimed is:

1. A burner holder for a burner lance in a glass melting plant, comprising
   a retaining unit for fastening the burner lance,
   a sealing plate having a passage,
      the sealing plate being configured to fasten on the glass melting plant and being provided with a recess for receiving a head of the burner lance, the recess forming at least a part of a passage through the sealing plate,
      the retaining unit being connected to the sealing plate via at least one first pivot bearing about which the retaining unit is rotatable or pivotable about a first axis of rotation, the first pivot bearing being attached or embedded directly on the sealing plate or being connected to the sealing plate via a support arm situated on the sealing plate.

2. The burner holder as recited in claim 1, wherein the sealing plate or the support arm has a first bearing element and the retaining unit has a second bearing element, the first bearing element and the second bearing element together forming the first pivot bearing.

3. The burner holder as recited in claim 1, wherein the burner holder in addition has a hinged support and an actuating drive for rotating the retaining unit about the first axis of rotation, an end of the hinged support facing the retaining unit being connected to the retaining unit, and an opposite end of the hinged support being connected to the actuating drive.

4. The burner holder as recited in claim 3, wherein the actuating drive is realized at least one of pneumatically or electrically.

5. The burner holder as recited in claim 4, wherein the actuating drive is at least one of remotely or automatically controlled by a control unit.

6. The burner holder as recited in claim 1, wherein the recess of the sealing plate is shaped as a spherical disk at least in some segments, and wherein the first axis of rotation extends through a midpoint of a curvature of the spherical disk-shaped segment of the recess.

7. The burner holder as recited in claim 6,
wherein the burner holder has a second pivot bearing, the burner lance, when mounted on the retaining unit, being capable of being rotated about a second axis of rotation determined by the second pivot bearing, the second axis of rotation running at an angle to the first axis of rotation, and
wherein the second axis of rotation extends through the midpoint of the curvature of the spherical disk-shaped segment of the recess, and intersects the first axis of rotation at the midpoint of the curvature of the spherical disk-shaped segment of the recess.

8. The burner holder as recited in claim 1, wherein the burner holder has a second pivot bearing, the burner lance, when mounted on the retaining unit, being capable of being rotated about a second axis of rotation determined by the second pivot bearing, the second axis of rotation running at an angle to the first axis of rotation.

9. The burner holder as recited in claim 8, wherein the second axis of rotation runs orthogonally to the first axis of rotation.

10. A system for mounting a burner lance on a glass melting plant having the burner holder as recited in claim 1 and having a burner lance, the burner lance being fastened on the retaining unit in such a way that a head of the burner lance is situated in the recess of the sealing plate and lies on the inner side of the recess.

\* \* \* \* \*